United States Patent
Lee et al.

(10) Patent No.: US 12,406,981 B2
(45) Date of Patent: Sep. 2, 2025

(54) NEGATIVE ELECTRODE FOR LITHIUM SECONDARY BATTERY AND LITHIUM SECONDARY BATTERY COMPRISING SAME

(71) Applicant: LG Energy Solution, Ltd., Seoul (KR)

(72) Inventors: Taek Soo Lee, Daejeon (KR); Jin Ho Cho, Daejeon (KR); Jong Su Yoon, Daejeon (KR); Shin Wook Jeon, Daejeon (KR); Young Gon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/730,216

(22) PCT Filed: Sep. 15, 2023

(86) PCT No.: PCT/KR2023/013861
§ 371 (c)(1),
(2) Date: Jul. 18, 2024

(87) PCT Pub. No.: WO2024/058584
PCT Pub. Date: Mar. 21, 2024

(65) Prior Publication Data
US 2025/0105253 A1    Mar. 27, 2025

(30) Foreign Application Priority Data

Sep. 16, 2022 (KR) .................. 10-2022-0116873
May 15, 2023 (KR) .................. 10-2023-0062304

(51) Int. Cl.
*H01M 4/133* (2010.01)
*H01M 10/052* (2010.01)
*H01M 4/02* (2006.01)

(52) U.S. Cl.
CPC ......... *H01M 4/133* (2013.01); *H01M 10/052* (2013.01); *H01M 2004/027* (2013.01)

(58) Field of Classification Search
CPC . H01M 4/133; H01M 10/052; H01M 10/0525
(Continued)

(56) References Cited

U.S. PATENT DOCUMENTS

| | | | | |
|---|---|---|---|---|
| 2014/0093781 A1* | 4/2014 | Nishihara | ............. | H01M 4/587 429/231.8 |
| 2015/0030931 A1* | 1/2015 | Takahata | ............... | H01M 4/133 427/547 |

(Continued)

FOREIGN PATENT DOCUMENTS

| | | | | |
|---|---|---|---|---|
| CN | 111987344 A | * | 10/2020 | ........ H01M 10/0525 |
| CN | 112820855 A | * | 5/2021 | .......... H01M 10/052 |

(Continued)

OTHER PUBLICATIONS

CN 111987344 A machine translation (Year: 2020).*
(Continued)

*Primary Examiner* — Jonathan G Leong
*Assistant Examiner* — John S Medley
(74) *Attorney, Agent, or Firm* — Lerner David LLP

(57) ABSTRACT

A negative electrode for a lithium secondary battery in which lithium precipitation is suppressed. The negative electrode has a form in which a high degree of alignment of a carbon-based active material contained in a sliding portion of the negative electrode active layer is realized. Accordingly, the negative electrode has an excellent effect of suppressing lithium precipitation at the end of the negative electrode active layer during charging and discharging of the secondary battery, so that a lithium secondary battery including the negative electrode has high safety and can be charged and discharged for a long time under high rate conditions. A (Continued)

lithium secondary battery including the negative electrode is also provided.

10 Claims, 5 Drawing Sheets

(58) Field of Classification Search
USPC .......................................................... 429/209
See application file for complete search history.

(56) References Cited

U.S. PATENT DOCUMENTS

| | | | |
|---|---|---|---|
| 2017/0309873 A1 | 10/2017 | Kono et al. | |
| 2018/0062168 A1* | 3/2018 | Gonser | H01M 4/386 |
| 2018/0151867 A1* | 5/2018 | Lim | H01M 4/0435 |
| 2018/0159118 A1 | 6/2018 | Lee et al. | |
| 2022/0263063 A1 | 8/2022 | Lee et al. | |
| 2022/0367881 A1* | 11/2022 | Komura | H01M 4/70 |
| 2023/0122728 A1* | 4/2023 | Zhang | H01M 4/505 429/209 |
| 2023/0131033 A1 | 4/2023 | Yang et al. | |
| 2024/0047668 A1 | 2/2024 | Lho et al. | |

FOREIGN PATENT DOCUMENTS

| | | | | |
|---|---|---|---|---|
| JP | H113700 A | * | 1/1999 | ............ Y02E 60/10 |
| JP | 2013069431 A | | 4/2013 | |
| JP | 2013069432 A | | 4/2013 | |
| JP | 2013069579 A | | 4/2013 | |
| JP | 6394928 B2 | | 9/2018 | |
| KR | 20150028457 A | | 3/2015 | |
| KR | 101562724 B1 | | 10/2015 | |
| KR | 101607794 B1 | | 3/2016 | |
| KR | 20160125720 A | | 11/2016 | |
| KR | 20180065385 A | | 6/2018 | |
| KR | 102255125 B1 | | 5/2021 | |
| KR | 20220057713 A | | 5/2022 | |
| KR | 20220092450 A | | 7/2022 | |

OTHER PUBLICATIONS

JP H113700 A machine translation (Year: 1999).*
International Search Report for Application No. PCT/KR2023/013861 mailed Dec. 26, 2023, pp. 1-3.
Extended European Search Report including Written Opinion for Application No. 23865880.1 dated Jul. 4, 2025. 7 pages.

* cited by examiner

[FIG. 1]
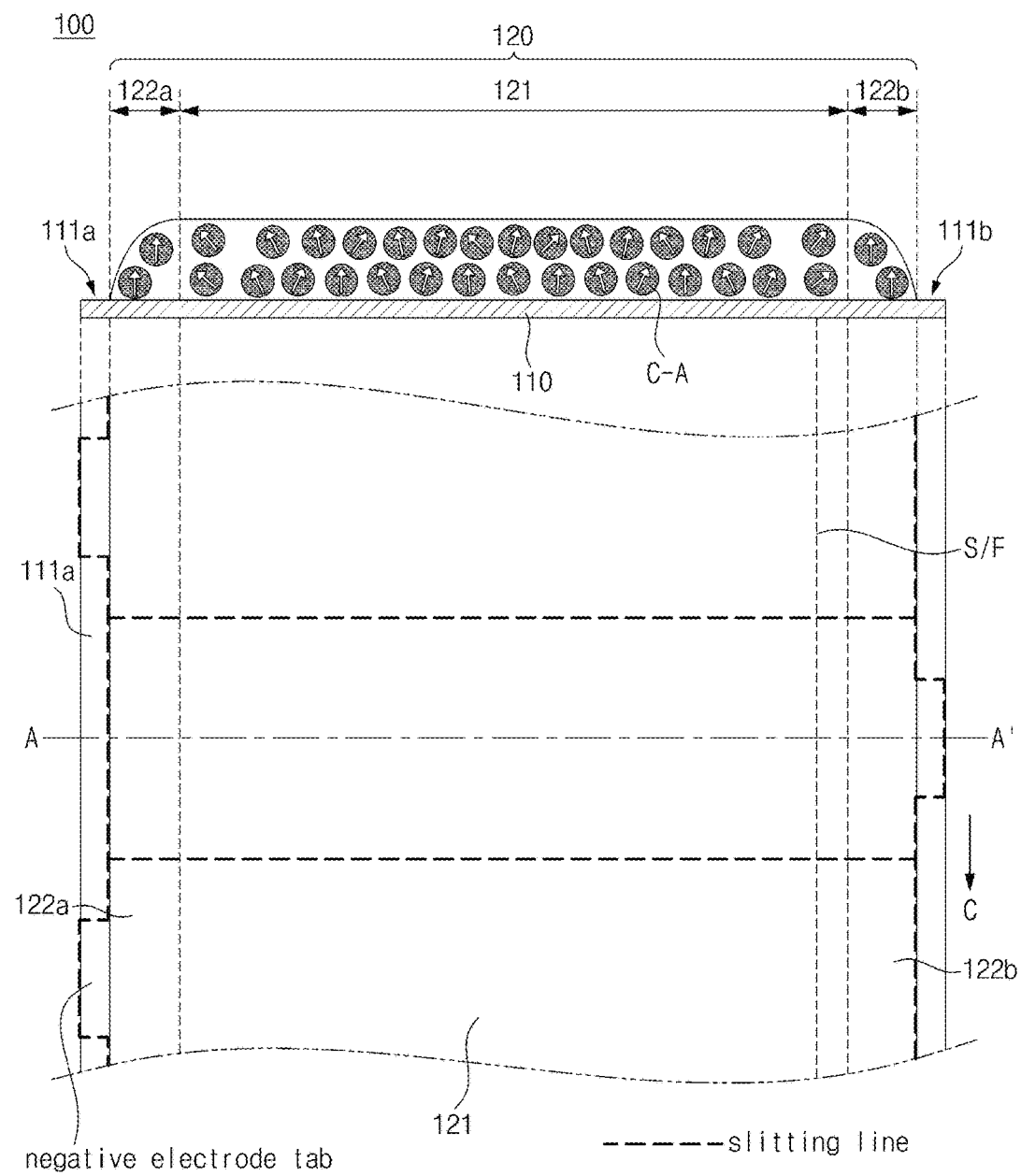

[FIG. 2]
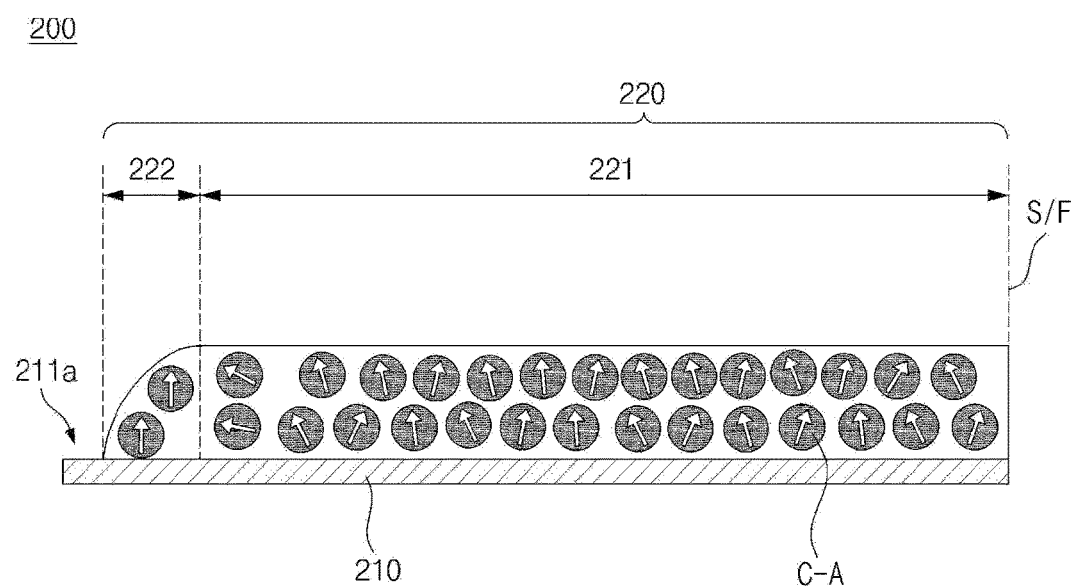

[FIG. 3]
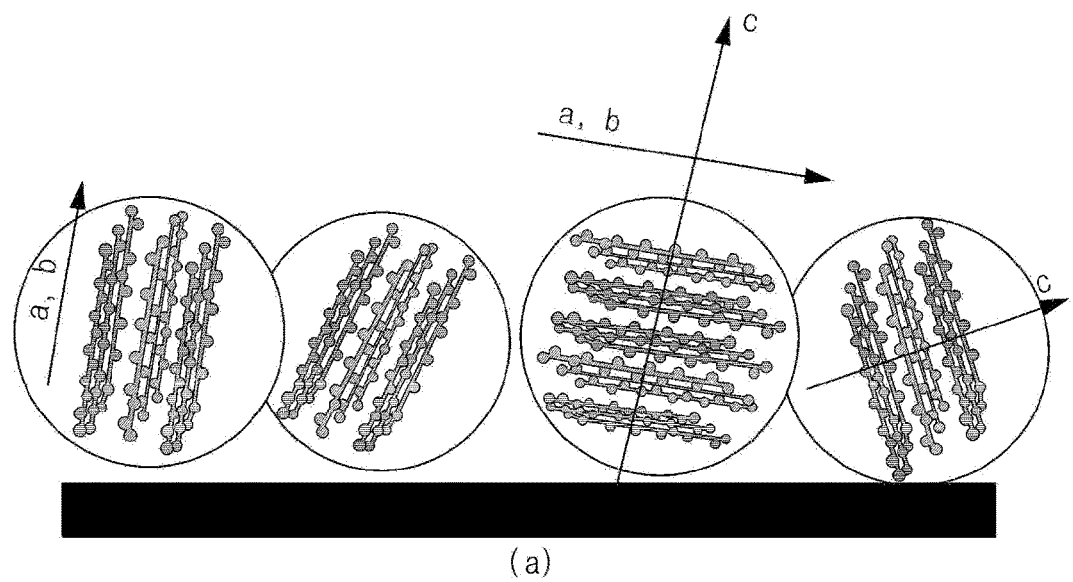
(a)
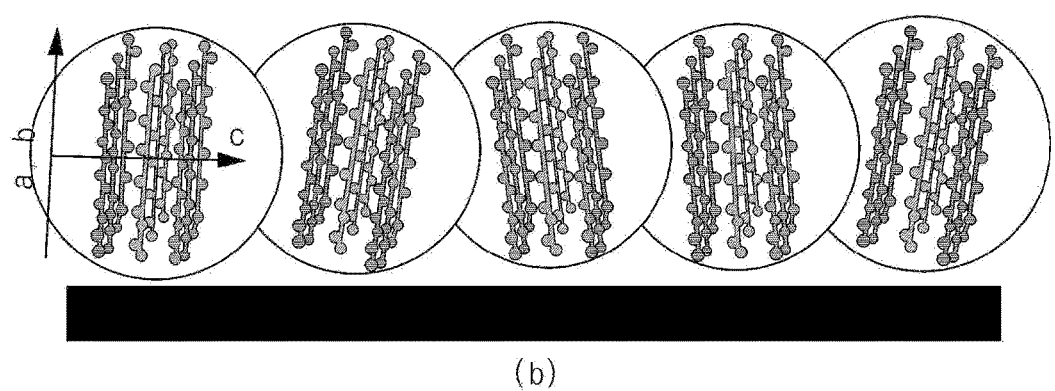
(b)

[FIG. 4]
(a)
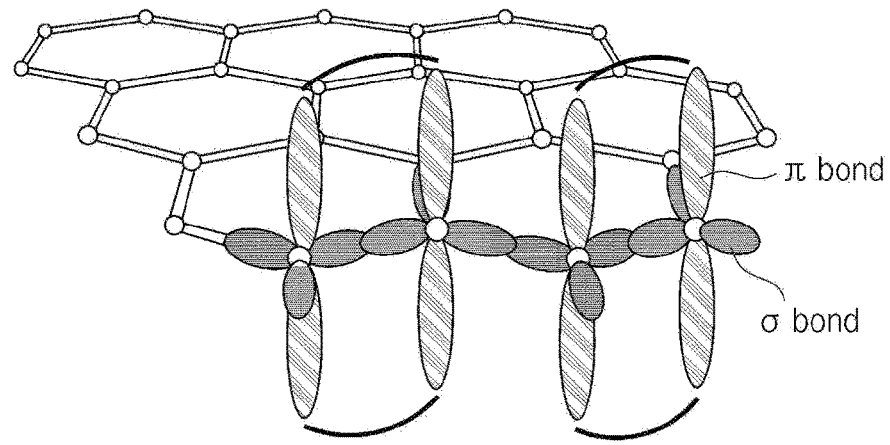
(b)
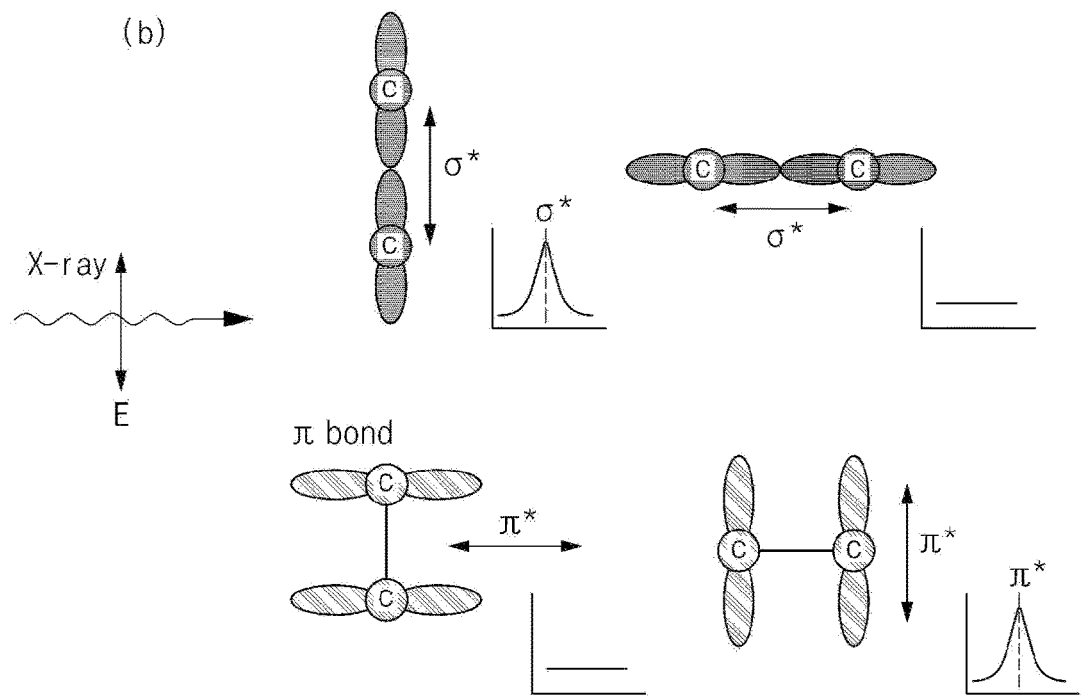

[FIG. 5]
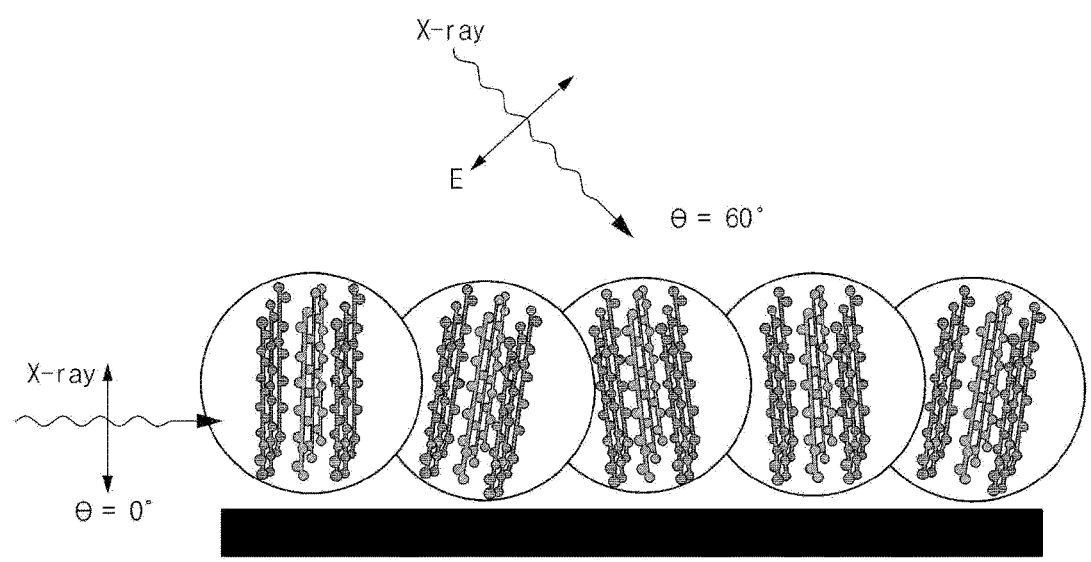

NEGATIVE ELECTRODE FOR LITHIUM SECONDARY BATTERY AND LITHIUM SECONDARY BATTERY COMPRISING SAME

CROSS-REFERENCE TO RELATED APPLICATIONS

The present application is a national phase entry under 35 U.S.C. § 371 of International Application No. PCT/KR2023/013861 filed Sep. 15, 2023, which claims priority to Korean Patent Application No. 10-2022-0116873, filed on Sep. 16, 2022, and Korean Patent Application No. 10-2023-0062304, filed on May 15, 2023, all the entire disclosures of which are incorporated herein by reference.

TECHNICAL FIELD

The present disclosure relates to a negative electrode for a lithium secondary battery with suppressed lithium precipitation during charge and discharge, and a lithium secondary battery comprising the same.

BACKGROUND ART

Recently, secondary batteries have been widely applied in small devices such as portable electronics, as well as in medium and large devices such as battery packs or power storage in hybrid vehicles or electric vehicles.

These secondary batteries are chargeable/dischargeable power generators consisting of a laminated structure of a positive electrode, a separator, and a negative electrode, with the positive electrode generally containing lithium metal oxide as a positive electrode active material and the negative electrode containing a carbon-based negative electrode active material such as graphite, so that lithium ions released from the positive electrode are absorbed into the carbon-based negative electrode active material of the negative electrode during charging, and lithium ions contained in the carbon-based negative electrode active material are absorbed into the lithium metal oxide of the positive electrode during discharging, and the charge and discharge are repeated.

One of the factors that determine the performance of a secondary battery is the capacity ratio of the active materials contained in the positive electrode and negative electrode. This capacity ratio can be expressed as the N/P ratio. The N/P ratio is the total capacity of the negative electrode, calculated by considering the capacity per unit area of the negative electrode, divided by the total capacity of the positive electrode, obtained by considering the capacity per unit area of the positive electrode, and is generally controlled to have a value of 1 or more, as it has a significant impact on the safety and capacity of the battery.

However, when manufacturing the positive electrode and negative electrode, a sliding phenomenon is induced at the end of the electrode composite layer containing the active material, where the thickness of the electrode composite layer becomes thinner toward the outside, making it difficult to consistently satisfy the N/P ratio of the positive electrode and negative electrode. In particular, if the N/P ratio becomes less than 1, when the battery is charged, not all of the lithium ions can intercalate into the negative electrode active material and precipitate on the negative electrode surface to form a dendrite. The likelihood of dendrites is significantly increased when lithium secondary batteries are used for a long period of time under high rate conditions, and the dendrites formed can cause an internal short circuit of the battery, which may compromise the safety of the battery.

In order to solve these problems, negative electrodes with a thicker end thickness have been attempted to reduce the sliding phenomenon during the formation of the negative electrode composite layer. In this case, the rolling of the negative electrode composite layer results in densification of the negative electrode active material at the end of the negative electrode composite layer, which has the limitation of reducing the mobility of lithium ions at the end, resulting in poor battery performance.

RELATED ART DOCUMENT

Patent Document

Korean Patent Laid-Open Publication No. 10-2015-0028457

Korean Patent Laid-Open Publication No. 10-2016-0125720

Technical Problem

It is an object of the present disclosure to provide a negative electrode for a lithium secondary battery, and a lithium secondary battery comprising the negative electrode, in which precipitation of lithium from the end of the negative electrode composite layer is suppressed even when the lithium secondary battery is used for a long time under high rate conditions.

Technical Solution

To address the problems described above,
in an exemplary embodiment, the present disclosure provides:
a negative electrode for a lithium secondary battery including:
a negative electrode current collector; and a negative electrode active layer arranged on at least one side of the negative electrode current collector and comprising a carbon-based negative electrode active material; wherein:
the negative electrode active layer is divided into: a flat portion having a constant thickness relative to the cross-sectional structure; and a sliding portion disposed at an end of the flat portion and having a thickness gradient; wherein:
the sliding portion has a value of 1.0 or less according to Equation 1 below when analyzed by near-end X-ray absorption fine structure (NEXAFS) spectroscopy:

$$S_{60/0} = \frac{I60_{B/A}}{I0_{B/A}} \quad \text{[Equation 1]}$$

$$I60_{B/A} = \frac{I60_B}{I60_A} \quad \text{[Equation 2]}$$

$$I0_{B/A} = \frac{I0_B}{I0_A} \quad \text{[Equation 3]}$$

in Equation 1 to Equation 3,
$S_{600}$ represents a value of a ratio of a ratio of a peak intensity ($I60_{B/A}$) at an incident angle of 60° of the X-ray to a ratio of a peak intensity ($I0_{B/A}$) at an incident angle of 0° of the X-ray, I60$_A$ represents an intensity of a strongest peak present at 286±1.0 eV, at the incidence angle of 60°, I60$_B$ represents an intensity of a strongest peak present at 292.5±1.0 eV at the incidence angle of 60°, I0$_A$ represents an intensity of a strongest peak at 286±1.0 eV at the incidence angle of 0°, I0$_B$ represents an intensity of a strongest peak present at 292.5±1.0 eV at the incidence angle of 0°.

Here, the sliding portion has an alignment (O.I$_{sliding}$) of the carbon-based negative electrode active material according to Equation 4 below that may be smaller than the alignment (O.I$_{flat}$) of the carbon-based negative electrode active material contained in the flat portion:

$$O.I = I_{004}/I_{110} \qquad \text{[Equation 4]}$$

wherein, in Equation 4,

I$_{004}$ represents the area of the peak representing the (0,0,4) crystal face in the X-ray diffraction spectroscopy (XRD) measurement of the negative active layer, I$_{110}$ represents the area of the peak representing the (1,1,0) crystal face in an X-ray diffraction (XRD) measurement of the negative active layer.

Specifically, the alignment (O.I$_{flat}$) of the carbon-based negative electrode active material contained in the flat portion may have a ratio of 110% to 200% based on the alignment (O.I$_{sliding}$) of the carbon-based negative electrode active material contained in the sliding portion.

In addition, the alignment (O.I$_{sliding}$) of the carbon-based negative electrode active material in the sliding portion may be 0.1 to 0.6.

Moreover, the sliding portion may have a ratio (I$_{004}$/I$_{002}$) of the intensity of the peak representing the (0,0,4) crystal face to the intensity of the peak representing the (0,0,2) crystal face in X-ray diffraction (XRD) spectroscopy that is greater than or equal to 0.04.

Meanwhile, the negative electrode current collector is divided into a coating portion having a negative electrode active layer disposed thereon and a non-coating portion having no negative electrode active layer disposed thereon, and among the non-coating portions, the sliding portion may abut a non-coating portion provided with a negative electrode tab.

Here, the sliding portion may have a width of 1 mm to 30 mm based on the cross-sectional structure of the negative electrode active layer.

In addition, a carbon-based negative electrode active material may include one or more of the following: natural graphite and synthetic graphite, and may have a spherical particle shape with a sphericity of 0.75 or higher.

Furthermore, in an exemplary embodiment, the present disclosure provides a lithium secondary battery including:

an electrode assembly including a positive electrode, the negative electrode according to the above-mentioned present disclosure, and a separator disposed between the positive electrode and the negative electrode.

Here, the positive electrode may include: a positive electrode current collector; and a positive electrode active layer provided on at least one side of the positive electrode current collector and containing at least one type of lithium metal oxides represented by Chemical Formula 1 and Chemical Formula 2 below as a positive electrode active material:

$\text{Li}_x[\text{Ni}_y\text{Co}_z\text{Mn}_w\text{M}^1_v]\text{O}_2$ [Chemical Formula 1]

$\text{LiM}^2_p\text{Mn}_{1-p}\text{O}_4$ [Chemical Formula 2]

in Chemical Formula 1 and Chemical Formula 2,

M$^1$ is one or more of the following elements of W, Cu, Fe, V, Cr, Ti, Zr, Zn, Al, In, Ta, Y, La, Sr, Ga, Sc, Gd, Sm, Ca, Ce, Nb, Mg, B, and Mo, x, y, z, w, and v are 1.0≤x≤1.30, 0.5≤y<1, 0<z≤0.3, 0<w≤0.3, and 0≤v≤0.1, respectively, and y+z+w+v=1, M$^2$ is Ni, Co, or Fe, and p is 0.05≤p≤1.0.

Specifically, the positive electrode active material may include one or more of the following: LiNi$_{0.8}$Co$_{0.1}$Mn$_{0.1}$O$_2$, LiNi$_{0.6}$Co$_{0.2}$Mn$_{0.2}$O$_2$, LiNi$_{0.9}$Co$_{0.05}$Mn$_{0.05}$O$_2$, LiNi$_{0.6}$Co$_{0.2}$Mn$_{0.1}$Al$_{0.1}$O$_2$, LiNi$_{0.6}$Co$_{0.2}$Mn$_{0.15}$Al$_{0.05}$O$_2$, LiNi$_{0.7}$Co$_{0.1}$Mn$_{0.1}$Al$_{0.1}$O$_2$, LiNi$_{0.7}$Mn$_{1.3}$O$_4$, LiNi$_{0.5}$Mn$_{1.5}$O$_4$, LiNi$_{0.3}$Mn$_{1.7}$O$_4$, LiFePO$_4$, LiFe$_{0.8}$Mn$_{0.2}$PO$_4$, and LiFe$_{0.5}$Mn$_{0.5}$PO$_4$.

In addition, the electrode assembly may be a stack-type electrode assembly; a zigzag electrode assembly; or a zigzag-stacked electrode assembly.

Advantageous Effects

The negative electrode for a lithium secondary battery according to the present disclosure has a low alignment (S$_{60/0}$ and/or O.I) of the carbon-based active material contained in the sliding portion of the negative electrode active layer, thereby having an excellent effect of suppressing lithium precipitation from the surface of the negative electrode active layer, more particularly from the end, during charging and discharging of the secondary battery, so that a lithium secondary battery including the negative electrode active layer has a high safety and has the advantage of being able to charge and discharge for a long time under high rate conditions.

BRIEF DESCRIPTION OF THE DRAWINGS

FIG. 1 is a cross-sectional view illustrating the cross-sectional structure of a negative electrode manufactured in an exemplary embodiment according to the present disclosure.

FIG. 2 is a cross-sectional view illustrating the cross-sectional structure of a negative electrode manufactured in another exemplary embodiment according to the present disclosure.

FIG. 3 is an image showing the alignment of the crystal faces of graphite in the a-b axis according to whether a magnetic field is applied to the negative electrode slurry during the formation of the negative electrode active layer, where (a) of FIG. 3 shows that the crystal faces of graphite are not aligned when no magnetic field is applied, and (b) of FIG. 3 shows that the crystal faces of graphite are aligned when a magnetic field is applied.

FIG. 4 is an image showing the trend of absorption peaks by type and position of each orbital according to the X-ray incident angle in near-end X-ray absorption fine structure (NEXAFS) spectroscopy, where (a) of FIG. 4 shows the type and position of orbits forming double bonds in graphite, and (b) of FIG. 4 shows the peak shape by position of each orbital at X-ray incident.

FIG. 5 is an image of an X-ray incident angle during near-end X-ray absorption fine structure (NEXAFS) spectroscopy on a negative electrode manufactured in an exemplary embodiment according to the present disclosure.

DETAILED DESCRIPTION

The present disclosure is subject to various modifications and can have many different embodiments, and specific embodiments will be described in detail in the following description.

However, this is not intended to limit the present disclosure to any particular embodiment and should be understood to include all modifications, equivalents, or substitutions that are within the scope of the idea and technology of the present disclosure.

Throughout this specification, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof.

Further, when a portion such as a layer, a film, an area, a plate, or the like is referred to as being "on" another portion, this includes not only the case in which the portion is "directly on" the another portion but also the case in which still another portion is interposed therebetween. In contrast, when a portion such as a layer, a film, an area, a plate, or the like is referred to as being "below" another portion, this includes not only the case in which the portion is "directly below" the another portion but also the case in which still another portion is interposed therebetween. In addition, to be disposed "on" in the specification of the present disclosure may include the case disposed at the lower portion as well as the upper portion.

Further, in the present disclosure, "comprising as a major component" may mean comprising 50 wt. % or more (or 50 vol. % or more), 60 wt. % or more (or 60 vol. % or more), 70 wt. % or more (or 70 vol. % or more), 80 wt. % or more (or 80 vol. % or more), 90 wt. % or more (or 90 vol. % or more), or 95 wt. % or more (or 95 vol. % or more) of the defined component relative to the total weight (or total volume). For example, "comprising graphite as the primary component of the negative electrode active material" may mean comprising at least 50 wt. %, at least 60 wt. %, at least 70 wt. %, at least 80 wt. %, at least 90 wt. %, or at least 95 wt. % graphite based on the total weight of the negative electrode active material, and in some cases may mean that the entire negative electrode active material is composed of graphite and comprises 100% graphite.

Furthermore, in the present disclosure, "cross-sectional structure" means a structure of a surface cut in the thickness direction of the negative electrode active layer; or a structure of a surface cut perpendicularly based on the surface of the negative electrode active layer. In this case, the cut surface may be the same as the surface cut perpendicular to the process direction when forming the negative electrode active layer; or the surface cut in the width direction of the negative electrode slurry applied to form the negative electrode active layer. Furthermore, the cross-sectional structure may be a structure of a surface cut in the thickness direction of the negative electrode active layer, but may have a structure cut in a direction proceeding from one side where a negative electrode tab is formed to the opposite side thereof. That is, it may have a thickness-directional cut structure in which the negative electrode tab is arranged on one side.

Also, as used herein, "carbon-based negative electrode active material is oriented" or "carbon-based negative electrode active material is aligned" may mean that certain crystal faces (e.g., the a-b axis crystal faces of graphite) representing the two-dimensional planar structure of the carbon-based negative electrode active material comprising the negative electrode active material particles are arranged to have a predetermined tilt relative to the surface of the negative electrode current collector, as shown in (b) of FIG. 3. This may be different from the carbon-based negative electrode active material particles themselves being oriented in a predetermined direction only within the negative electrode active layer and not having directionality with respect to the negative electrode current collector, as shown in (a) of FIG. 3.

In addition, "highly oriented carbon-based negative electrode active material" may mean that certain crystal faces (e.g., a-b axis crystal faces of graphite) representing the two-dimensional planar structure of the carbon-based negative electrode active material contained in the negative electrode active layer have a high frequency of having a predetermined tilt relative to the negative electrode current collector surface. It may also mean, in some cases, that the crystal faces of the carbon-based negative electrode active material contained in the negative electrode active layer are arranged at a high angle (e.g., a near-vertical angle, greater than 45°; specifically greater than) 60° relative to the surface of the negative electrode current collector.

In addition, "high alignment of the carbon-based negative electrode active material" means that the "alignment (O.I)" referred to herein has a large value, which may mean that certain crystal faces (e.g., a-b axis crystal faces of graphite) representing the two-dimensional planar structure of the carbon-based negative electrode active material contained in the negative electrode active layer are arranged at a low angle (e.g., less than) 45° relative to the surface of the negative electrode current collector. Conversely, "low alignment of the carbon-based negative electrode active material" may mean that the "degree of alignment (O.I)" has a small value, such that the crystal faces of the carbon-based negative electrode active material contained in the negative electrode active layer are arranged at a high angle (e.g., an angle close to vertical, greater than 45°; specifically greater than) 60° relative to the surface of the negative electrode current collector.

Moreover, as used herein, "average particle diameter ($D_{50}$)" means the particle diameter at which the sum value is 50% in the particle diameter distribution of the particles, which is also referred to as the median diameter.

Hereinafter, the present disclosure will be described in more detail.

Negative Electrode for Lithium Secondary Battery

In an exemplary embodiment, the present disclosure provides a negative electrode for a lithium secondary battery, including:
- a negative electrode current collector; and
- a negative electrode active layer arranged on at least one side of the negative electrode current collector and comprising a carbon-based negative electrode active material;
- wherein the negative electrode active layer is divided into: a flat portion having a constant thickness relative to a cross-sectional structure; and a sliding portion disposed at an end of the flat portion and having a thickness gradient;
- wherein the sliding portion has a value of 1.0 or less according to Equation 1 below when analyzed by near-end X-ray absorption fine structure (NEXAFS) spectroscopy:

$$S_{60/0} = \frac{I60_{B/A}}{I0_{B/A}}. \quad \text{[Equation 1]}$$

The negative electrode for a lithium secondary battery according to the present disclosure includes a negative electrode active layer including a carbon-based negative electrode active material on at least one side of the negative electrode current collector.

In this case, the negative electrode active layer refers to a layer that realizes the electrical activity of the negative electrode. The negative electrode active layer includes a carbon-based negative electrode active material as a negative electrode active material to realize electrical activity through a reversible redox reaction during charging and discharging of the battery. Specifically, the carbon-based negative electrode active material refers to a material having carbon atoms as a main component, and such a carbon-based negative electrode active material may include graphite. The graphite may include one or more of natural graphite, or synthetic graphite. For example, the carbon-based negative electrode active material may include natural graphite or synthetic graphite alone, or in some cases, a mixture of natural and synthetic graphite. In this case, the ratio of natural graphite to synthetic graphite can be 5 to 40:60 to 95, or 10 to 30:70 to 90, based on weight. By including natural graphite and synthetic graphite in the mixing ratio as described above, the carbon-based negative electrode active material can strengthen the adhesion of the negative electrode current collector and the negative electrode active layer, while achieving a high orientation of the carbon-based negative electrode active material to the surface of the negative electrode current collector.

In addition, the carbon-based negative electrode active material is preferably a spherical graphite assembly formed by aggregation of a plurality of flake graphite. The flake graphite can be natural graphite, synthetic graphite, mesophase calcined carbon (bulk mesophase) made from tar and pitch, graphitized cokes (raw coke, green coke, pitch coke, needle coke, petroleum coke, etc.), and the like, and in particular, it is preferred to be assembled using a plurality of highly crystalline natural graphite. In addition, one graphite assembly may be formed from 2 to 100 pieces of flake-shaped graphite, preferably 3 to 20 pieces.

Such carbon-based negative electrode active materials, specifically graphite, may have a spherical particle shape, wherein the sphericity of the graphite particles may be greater than or equal to 0.75, such as 0.75 to 1.0; 0.75 to 0.95; 0.8 to 0.95; or 0.90 to 0.99. Here, "sphericity" may mean the ratio of the shortest diameter (short diameter) to the longest diameter (long diameter) of any diameter passing through the center of the particle, wherein a sphericity of 1 means that the particle has a spherical shape. The sphericity may be determined by measuring the particle shape using a particle shape analyzer, or by measuring the shape of the particle using a scanning electron microscope (SEM), an energy dispersive spectrometer, or the like, and then analyzing the measured results.

The present disclosure has the advantage that by realizing the shape of the carbon-based negative electrode active material close to a spherical shape, the electrical conductivity of the negative electrode active layer can be realized high, thus improving the capacity of the battery, and the specific surface area per unit weight of the negative electrode active material can be increased, thus improving the adhesion between the negative electrode active layer and the current collector.

Further, the carbon-based negative electrode active material may have an average particle diameter ($D_{50}$) of 0.5 μm to 10 μm, and more specifically, may have an average particle diameter ($D_{50}$) of 2 μm to 7 μm; 0.5 μm to 5 μm; or 1 μm to 3 μm.

It may be advantageous to have a smaller average particle diameter of a near-spherical carbon-based negative electrode active material so as to maximize the disorder in the swelling direction for each particle to prevent the particles from swelling due to the charging of lithium ions. However, if the particle diameter of the carbon-based negative electrode active material is less than 0.5 μm, a large amount of binder is required due to the increase in the number of particles per unit volume, and the sphericity and sphericalization yield may decrease. On the other hand, if the maximum particle diameter exceeds 10 μm, the expansion rate of the negative electrode active material increases significantly during charge and discharge of the secondary battery, which can significantly reduce the cycling characteristics due to the poor cohesion between the negative electrode active material particles and the cohesion between the negative electrode active material particles and the current collector as the charge and discharge are repeated.

In addition, the negative electrode active layer may be prepared by applying a negative electrode slurry including a carbon-based negative electrode active material to at least one surface of the negative electrode current collector, followed by drying and rolling, in order to realize electrical activity via a reversible redox reaction during charging and discharging of the secondary battery.

Referring to FIGS. 1 and 2 to describe the cross-sectional structure of the negative electrode, the negative electrode active layers 120 and 220 of the present disclosure are divided into flat portions 121 and 221 having a uniform thickness in the center based on the cross-sectional structure, and sliding portions 122a, 122b, and 222 having a thickness gradient at the edges of the flat portions, that is, the ends of the flat portions.

The flat portions 121 and 221 are regions comprising a majority of the negative electrode active layers 120 and 220, and may have a ratio of 80% or more; 85% or more; 90% or more; 93% or more; 95% or more; 97% or more; 96% to 99%; 98% to 99.5%; or 98.5% to 99.9% of the total length in the width direction, based on the cross-sectional structure of the negative electrode active layers 120 and 220. Accordingly, the sliding portions 122a, 122b, and 222, which are located at the ends of the flat portions 121 and 221 and form the negative electrode active layers 120 and 220 together with the flat portions, may have a ratio of 20% or less; 15% or less; 10% or less; 7% or less; 5% or less; 3% or less; 1% to 4%; 0.5% to 2%; or 0.1 to 1.5% of the total length in the width direction, based on the cross-sectional structure of the negative electrode active layer. In this case, the sliding portions 122a, 122b, and 222 may have a width ranging from 1 mm to 30 mm inwardly of the negative electrode active layer from the boundary line with the negative electrode current collectors 110 and 210, based on the cross-sectional structure of the negative electrode active layer, and more specifically, may have a width ranging from 1 mm to 5 mm; 1 mm to 10 mm; 1 mm to 20 mm; 5 mm to 10 mm; 5 mm to 15 mm; 5 mm to 25 mm; 10 mm to 20 mm; 10 mm to 30 mm; 15 mm to 30 mm; or 20 mm to 30 mm.

Here, the "width direction of the negative electrode active layer" may mean a direction perpendicular to the traveling direction C of the negative electrode current collector on the surface of the negative electrode active layer (or negative electrode slurry) during negative electrode manufacturing. It may also be the same as the direction from one side of the negative electrode active layer formed with the negative electrode tabs (not shown) of the manufactured negative electrodes 100 and 200 travelling to the other side opposite thereto. By adjusting the length ratio and/or width-length of the flat portions 121 and 221 and the sliding portions 122a, 122b, and 222 to the above ranges, the present disclosure can further increase the energy density of the negative electrode, and at the same time prevent a decrease in productivity in manufacturing the negative electrode.

Meanwhile, the negative electrode current collectors 110 and 210 provided on the negative electrode 100 and 200 may be divided into a coating portion on which the negative electrode active layers 120 and 220 are disposed and a non-coating portion on which the negative electrode active layers 120 and 220 are not disposed, and any of the non-coating portions may be provided with a negative electrode tab for electrically connecting with the negative electrode terminal.

Here, the sliding portion of the negative electrode active layer may be located on all or selectively on a portion of the edge of the flat portion. Preferably, the sliding portions 122a, 112b, and 222 are located at the edges of the negative electrode active layers 120 and 220, bordering by contact with the non-coating portion of the negative electrode current collectors 110 and 210, wherein the non-coating portion may be the non-coating portions 111a and 211a on which the negative electrode tabs are provided. The region where the negative electrode tabs are located has a large electrical resistance due to the high current density induced by the polarization of the electrochemical reaction, so lithium precipitation can easily occur on the surface of the negative electrode active layer adjacent to the negative electrode tabs. However, if the sliding portions 122a and 222 of the present disclosure are disposed in a position forming a boundary line (e.g., a first boundary line) with the negative electrode non-coating portions 111a and 211a in which the negative electrode tabs are provided, the orientation of the a-b axis crystal faces of the carbon-based negative electrode active material contained in the sliding portions can be controlled to lower the electrical resistance of the negative electrode active layer adjacent to the negative electrode tabs, thus preventing lithium from precipitating into dendrites.

In one example, the sliding portions 122a and 122b may be disposed at an edge of the negative electrode active layer 120 as shown in FIG. 1 when the negative electrode 100 is manufactured via a roll-to-roll process, and may be disposed at a first edge of the negative electrode active layer 120 forming a first boundary line abutting the first non-coating portion 111a where the negative electrode tabs are provided; and at a second edge of the negative electrode active layer 120 forming a second boundary line opposite to the first boundary line in contact with a second non-coating portion 111b opposite the first non-coating portion 111a. In this case, the third edge and the fourth edge of the negative electrode active layer adjacent to the first edge and the second edge may have a cut surface by slitting during the manufacture of the negative electrode, and accordingly, a sliding portion with a thickness gradient of the negative electrode active layer may not exist.

As another example, the sliding portion 222 may be disposed at an edge of the negative electrode active layer 220 as shown in FIG. 2, but only at an edge of the negative electrode active layer 220 that forms a first boundary line abutting the first non-coating portion 211a on which the negative electrode tab is provided. At this time, the second edge of the negative electrode active layer 120 forming the second boundary line opposite the first boundary line may have a cut surface (corresponding to S/F in FIG. 2) by slitting during the manufacture of the negative electrode, and thus, a sliding portion with a thickness gradient of the negative electrode active layer may not exist.

Furthermore, the sliding portions 122a, 122b, and 222 have a thickness gradient that becomes thinner as they are spaced apart from the points that are in contact with the flat portions 121 and 221 because a sliding phenomenon of the negative electrode slurry including the negative electrode active layer is induced at the end of the negative electrode in the manufacture of the negative electrode. Specifically, the negative electrode slurry used in the manufacture of the active layer of the negative electrode has the form of graphite, a carbon-based negative electrode active material, mixed with a dispersant. The dispersant is typically water. Water is a solvent with a high surface tension, and the negative electrode slurry containing water exhibits a phenomenon of reducing the surface area exposed to air after being applied to the negative electrode current collector due to its high surface tension. Accordingly, the negative electrode slurry applied to the negative electrode current collector induces a sliding phenomenon in which the negative electrode slurry tries to form a curved surface with a predetermined angle to the surface of the negative electrode current collector inwardly.

However, this sliding phenomenon is generally difficult to allow the N/P ratio of the positive electrode and negative electrode to be consistently satisfied. In particular, when the N/P ratio becomes smaller than 1, the lithium ions cannot all intercalate into the carbon-based negative electrode active material when the battery is charged and may precipitate onto the negative electrode surface to form a dendrite. Dendrites are particularly likely to occur when lithium secondary batteries are used for long periods of time under high rate conditions, and they can cause internal short circuits, which may compromise the safety of the battery.

However, the present disclosure can prevent lithium from precipitating into dendrites on the negative electrode surface during charge and discharge by controlling the crystal face orientation of the carbon-based negative electrode active material contained in the sliding portion, as shown in FIG. 3. Specifically, the sliding portion may include a carbon-based negative electrode active material having an a-b axis crystal face representing a two-dimensional planar structure of the carbon-based negative electrode active material aligned substantially perpendicular to the negative electrode current collector.

Here, "the carbon-based negative electrode active material is aligned substantially perpendicular to the negative electrode current collector" may mean that the crystal faces of the carbon-based negative electrode active material comprising the spherical particles, specifically the a-b axis crystal faces representing the plane direction of the graphite having a two-dimensional structure, are arranged with a slope substantially perpendicular to the surface of the negative electrode current collector. In this case, the plane direction of the graphite (i.e., the a-b axis crystal plane direction) may have an average slope of 60° to 120° with respect to the negative electrode current collector, preferably 70° to 110°; or 80° to 100°.

Furthermore, the alignment of the carbon-based negative electrode active material may be applied without being particularly limited to any method conventionally applied in the art, but specifically, it may be induced by applying a magnetic field to the surface of the negative electrode slurry containing the carbon-based negative electrode active material after applying the negative electrode slurry to the surface of the negative electrode current collector, and then orienting the negative electrode slurry by applying a magnetic field from the upper and lower portions of the negative electrode slurry. At this time, the magnetic field may be applied only to the sliding portion of the negative electrode slurry, but in the present disclosure, a magnetic field may be applied to a front surface including the flat portion and sliding portion of the negative electrode slurry. In the manufacture of the negative electrode, the negative electrode slurry located at the sliding portion forms a predetermined angle with the negative electrode current collector due to a thickness gradient. The angle of the sliding portion implemented in this way increases the exposure of the magnetic field to the carbon-based negative electrode active material when a magnetic field is applied to the front surface of the negative electrode slurry, and thus serves as a factor that causes a magnetic field to be applied that is greater than the intensity of the magnetic field applied to the flat portion. Therefore, in this case, each carbon-based negative electrode active material contained in the sliding portion and the flat portion is aligned to have a predetermined slope with respect to the negative electrode current collector. Furthermore, the carbon-based negative electrode active material in the sliding portion is aligned at a high angle close to vertical with respect to the surface of the negative electrode current collector, so a relatively lower alignment can be realized compared to the carbon-based negative electrode active material in the flat portion. In comparison, if a magnetic field is applied only to the negative electrode slurry located in the sliding portion during negative electrode manufacturing, the carbon-based negative electrode active material contained in the sliding portion can be aligned close to vertical with respect to the negative electrode current collector, but there is a limitation that the alignment is not uniform.

Furthermore, the alignment of the carbon-based negative electrode active material can be controlled by the strength of the applied magnetic field or the time of exposure. For example, when a magnetic field is applied to the surface of a negative electrode slurry containing the carbon-based negative electrode active material for 1 to 10 seconds, the slope of the a-b axis crystal face of the carbon-based negative electrode active material in the negative electrode slurry with a magnetic field applied for 10 seconds relative to the negative electrode current collector surface may be greater than that of the carbon-based negative electrode active material in the negative electrode slurry with a magnetic field applied for 1 second. In the present disclosure, the magnetic field application to the negative electrode slurry may be performed at an intensity of 0.5 T to 2.0 T and for a duration of 1 s to 60 s. Specifically, the magnetic field application may be performed at an intensity of 0.8 T to 1.5 T; or 0.8 T to 1.2 T for a duration of 1 s to 30 s; or 1 s to 20 s. In addition, the magnet used to apply the magnetic field to the negative electrode slurry may have a length ratio ranging from 105% to 200% based on the width direction of the negative electrode slurry, more specifically, a length ratio of 110% to 180%; 110% to 160%; 110% to 140%; 110% to 130%; 130% to 150%; or 105% to 120% based on the width direction of the negative electrode slurry. By adjusting the length ratio of the magnets disposed on the surface of the negative electrode slurry as described above when applying a magnetic field to the negative electrode slurry, the present disclosure can apply the magnetic field more uniformly across the exposed surface of the sliding portion.

Meanwhile, the alignment of the carbon-based negative electrode active materials contained in the negative electrode active layer can be determined by molecular orientation and/or crystal structure analysis of the carbon-based negative electrode active materials. In one example, the sliding portion of the negative electrode active layer may be aligned such that the carbon-based negative electrode active material is nearly perpendicular to the negative electrode current collector, such that a near-end X-ray absorption fine structure (NEXAFS) spectroscopic analysis satisfies a value of 1.0 or less according to Equation 1 below:

$$S_{60/0} = \frac{I60_{B/A}}{I0_{B/A}} \quad \text{[Equation 1]}$$

(In Equation 1, $S_{60/0}$ represents the value of a ratio of the ratio of peak intensity ($I60_{B/A}$) when the X-ray is incident at an angle of 60° to the ratio of peak intensity ($I0_{B/A}$) when the X-ray is incident at an angle of 0° in the analysis of near-end X-ray absorption fine structure (NEXAFS) spectroscopy).

Unlike X-ray photoelectron spectroscopy (XPS), which measures the bonding energy between the atoms comprising a compound, Near Edge X-ray Absorption Fine Structure (NEXAFS) spectroscopy can only reflect the local structure in the vicinity of carbon atoms containing excited valence electrons and the surface structure of the measured carbon-based negative electrode active material particles. Thus, by utilizing the spectra obtained by NEXAFS spectroscopic analysis of the negative electrode active layer, the present disclosure can measure the alignment of the carbon-based negative electrode active materials contained in the negative electrode active layer.

Specifically, when the carbon atom (C) of a carbon-based negative electrode active material is irradiated with X-rays, the occupied electrons (K-angle valence electrons) present in the valence level (1 s orbital) of the carbon atom absorb the X-ray energy and are excited to various resonance molecular orbitals in the unoccupied state, and the NEXAFS spectroscopic analysis utilizes the observed absorption spectra. In the case of graphite, a carbon-based negative electrode active material, these resonance molecular orbitals are: i) the π* orbital, which is attributed to the antibonding orbitals of sp2 bonds, reflecting the crystallinity of graphite (e.g., basal or oriented), ii) the σ* orbital, which is attributed to the antibonding orbitals of the sp3 bonds that reflect disorder in the crystallinity (e.g., edges or disoriented), and iii) the Rydberg orbital, which is attributed to semi-conjugated orbitals such as C—H or C—O bonds.

Carbon-based negative electrode active materials, such as graphite, have a crystal structure in which carbon atoms are stacked in a hexagonal network structure (see (a) in FIG. 4) with sp2 bonds, where the two-dimensional plane of the hexagonal network (the a-b axis crystal face) is the base plane, and the plane where the ends of the hexagonal network appear (the c-axis crystal face) is the edge plane. On the edge surface of carbon-based negative electrode active materials, there may be —COOH, —C=O, etc. on the terminal carbon, so the sp3 bond ratio may be high. Therefore, the crystal face orientation and/or alignment of a carbon-based negative electrode active material can be analyzed by analyzing the state of the sp2 orbital of the carbon atoms on each crystal face of the carbon-based negative electrode active material.

The NEXAFS spectroscopic analysis described above can be performed by the all-electron quantitative method, in which the negative electrode active layer is irradiated with X-rays with a fixed angle of incidence to the negative electrode active layer, and the energy of the irradiating X-rays ranges from 280 eV to 320 eV, while measuring the current flowing through the negative electrode active layer to compensate for the photoelectrons emitted from the surface of the negative electrode active layer.

In this case, since the radiated light is an X-ray that is linearly polarized by applying a magnetic field (E), the intensity of the observed absorption peak may vary depending on the incident direction of the X-ray. Specifically, referring to (a) of FIG. 4, graphite, a carbon-based negative electrode active material, has a hexagonal network structure through sp2 bonds (—C═C—) of carbon atoms, wherein the sp2 bonds include a σ orbital located in a direction parallel to the sp2 bonds and a π orbital located in a direction perpendicular to the sp2 bonds. Here, the σ orbitals and π orbitals have a symmetrical structure with σ* orbitals and π* orbitals being semi-bonding orbitals and having nodes at the nuclear positions of the carbon atom, respectively, so that the σ* orbitals and π* orbitals have the same orientation as the σ orbitals and π orbitals.

Thus, as shown in (b) of FIG. 4, if the incident direction of the X-ray is parallel to the sp2 bond, the intensity of the absorption peak excited by the π* level from the 1 s level of the carbon becomes larger, and conversely, if it is orthogonal to the sp2 bond, the intensity of the absorption peak becomes smaller. On the other hand, if the incident direction of the X-ray is parallel to the sp2 bond, the intensity of the absorption peak excited by the σ* level from the 1 s level of the carbon becomes smaller, and if it is orthogonal to the sp2 bond, the intensity of the absorption peak becomes larger.

Due to this characteristic, if the graphite contained in the negative electrode active layer is highly oriented, as shown in (b) of FIG. 3, the semi-coordinated molecular orbitals of the graphite located on the surface of the negative electrode active layer are uniformly aligned, so that when the incident angle of the X-ray on the negative electrode active layer is changed, the spectral shape of the emitted photoelectrons changes significantly due to enhancement, interference, etc. On the other hand, if the graphite contained in the negative electrode active layer has a low orientation, as shown in (a) of FIG. 3, the molecular orbitals of the semi-conjugated resonance of the graphite located on the surface of the negative electrode active layer are unevenly aligned, so the spectral shape changes little when the incident angle of the X-ray on the sample is changed.

Accordingly, in order to measure the degree of orientation of the carbon-based negative electrode active material contained in the negative electrode active layer, the present disclosure performs a NEXAFS spectroscopic analysis of the surface of the negative electrode active layer, wherein X-rays are incident on the negative electrode active layer at different incident angles (0° and) 60°, and for each incident angle, the ratio ($I_{B/A}$) of the absorption peak attributable to the transition from the 1 s level to the π* level of carbon (peak A=287±0.2 eV) intensity to the absorption peak (peak B=293±0.2 eV) intensity attributable to the transition from the 1 s level to the σ level of carbon is obtained, and then the ratio of the intensity ratios between the incident angles (60° and) 0° ($S_{60/0}=I60_{B/A}/I0_{B/A}$) is calculated, so that the orientation and/or alignment of the carbon-based negative electrode active material contained in the negative electrode active layer can be quantitatively measured.

In other words, the degree of orientation of the carbon-based negative electrode active material contained in the sliding portion is determined by i) calculating the ratio ($I60_{B/A}$) of the absorption peak (peak A=287±0.2 eV) intensity ($I60_A$) attributable to the transition from the 1 s level to the π* level of carbon measured at an X-ray incident angle of 60° to the absorption peak (peak B=293±0.2 eV) intensity ($I60_B$) attributable to the transition from the 1 s level to the σ* level of carbon ($I60_B$) measured at an X-ray incident angle of 60°, as shown in Equation 2; ii) calculating the ratio ($I0_{B/A}$) of the intensity ($I0_A$) of the absorption peak (peak A=287±0.2 eV) attributable to the transition from the 1 s level to the π* level of carbon to the intensity ($I0_B$) of the absorption peak (peak B=293±0.2 eV) attributable to the transition from the 1 s level to the σ* level of carbon measured at an X-ray incident angle of 0°, as shown in Equation 3; and iii) finding the ratio of these ($S_{60/0}=I60_{B/A}/I0_{B/A}$) as shown in Equation 1:

$$I60_{B/A} = \frac{I60_B}{I60_A} \quad \text{[Equation 2]}$$

$$I0_{B/A} = \frac{I0_B}{I0_A} \quad \text{[Equation 3]}$$

in Equation 2 and Equation 3, $I60_A$ represents an intensity of a strongest peak present at 286±1.0 eV, at an incidence angle of 60°, $I60_B$ represents an intensity of a strongest peak present at 292.5±1.0 eV at an incidence angle of 60°, $I0_A$ represents an intensity of a strongest peak at 286±1.0 eV at an incidence angle of 0°, $I0_B$ represents an intensity of a strongest peak present at 292.5±1.0 eV at an incidence angle of 0°.

Here, the value according to Equation 1 ($S_{60/0}$) may mean that the closer to 1, the lower the orientation of the a-b axis crystal faces of the graphite, a carbon-based negative electrode active material, with respect to the negative electrode current collector and the higher the alignment (O.I), and the closer to 0, the higher the orientation of the a-b axis crystal faces of the graphite with respect to the negative electrode current collector and the lower the alignment (O.I). The sliding portion according to the present disclosure may be satisfied with a mean value of the values ($S_{60/0}$) according to Equation 1 of 1.0 or less, and more specifically may be satisfied with 0.9 or less; 0.8 or less; 0.7 or less; 0.5 or less; 0.05 to 0.7; 0.05 to 0.5; 0.05 to 0.4; 0.1 to 0.7; 0.3 to 0.7; or 0.5 to 0.8.

That the sliding portion of the negative electrode active layer according to the present disclosure satisfies Equation 1 ($S_{60/0}$) by 1 or less means that the a-b axis crystal faces of the carbon-based negative electrode active material contained in the sliding portion are aligned nearly perpendicular to the negative electrode current collector as shown in (b) of FIG. 3, which means that lithium precipitation can be suppressed at the end of the negative electrode active layer during charging and discharging of the secondary battery.

In addition, this is not the same as saying that the carbon-based negative electrode active material particles satisfy Equation 1 ($S_{60/0}$) to a value less than or equal to 1. When a carbon-based negative electrode active material particle satisfies Equation 1 ($S_{60/0}$) as less than or equal to 1, it means that the a-b axis crystal faces of the molecular crystals comprising the carbon-based negative electrode active material particle are aligned with a predetermined directionality within the particle. Therefore, the inclusion of such carbon-based negative electrode active material in the negative electrode active layer is differentiated from the sliding portion of the negative electrode active layer according to the present disclosure because, unless otherwise treated, the a-b axis crystal faces of the carbon-based negative electrode active material tend to be non-oriented with respect to the negative electrode current collector surface as shown in (a) of FIG. 3.

In another example, the sliding portion of the negative electrode active layer may be such that the a-b axis crystal faces of the carbon-based negative electrode active material are aligned nearly perpendicular to the negative electrode current collector, such that the alignment degree (O.I$_{sliding}$) of the carbon-based negative electrode active material represented by Equation 4 below is smaller than the alignment degree (O.I$_{flat}$) of the carbon-based negative electrode active material contained in the flat portion upon X-ray diffraction (XRD) spectroscopic analysis:

$$O.I = I_{004}/I_{110} \quad \text{[Equation 4]}$$

in Equation 4,

I$_{004}$ represents the area of the peak representing the (0,0,4) crystal face in the X-ray diffraction spectroscopy (XRD) measurement of the negative active layer, I$_{110}$ represents the area of the peak representing the (1,1,0) crystal face in an X-ray diffraction (XRD) measurement of the negative active layer.

The crystal face orientation of the carbon-based negative electrode active material can be determined by crystal face analysis of the carbon-based negative electrode active material, such as X-ray diffraction spectroscopy. The orientation index (O.I) of the carbon-based negative electrode active material represented by Equation 4 can be an indicator of the direction in which the crystal structure of the carbon-based negative electrode active material is aligned during X-ray diffraction measurements, specifically, the degree to which the a-b axis crystal planes representing the two-dimensional planar structure of the carbon-based negative electrode active material are aligned with respect to the negative electrode current collector surface. For example, if the negative electrode active layer includes graphite as a carbon-based negative electrode active material, an X-ray diffraction spectroscopy analysis of the negative electrode active layer shows peaks for graphite at 2θ=26.5±0.2°, 42.4±0.2°, 43.4±0.2°, 44.6±0.2°, 54.7±0.2°, and 77.5±0.2°. These represent the (0,0,2), (1,0,0), (1,0,1)R, (1,0,1)H, (0,0,4), and (1,1,0) crystal faces of the graphite contained in the negative electrode active layer. In general, in the case of graphite, graphene layers are placed on the a- and b-axis planes, and these graphene layers are stacked along the c-axis to form a hexagonal or rhombohedral crystal structure. The peak at 2θ=43.4±0.2° can also be seen as an overlap of the peaks corresponding to the (1,0,1) R plane of carbon-based materials and the (1,1,1) plane of current collectors, such as Cu.

The present disclosure is capable of measuring the degree of alignment (O.I) of graphite through the ratio of the areas of the peak at 2θ=77.5±0.2° representing the (1,1,0) plane and the peak at 2θ=54.7±0.2° representing the (0,0,4) plane, specifically, the ratio of the areas obtained by integrating the intensities of the peaks. In addition, X-ray diffraction was measured using a CuK α-ray as the target line, and to improve the peak intensity resolution, the target line was extracted with a monochromator device. In this case, the measurement conditions were 2θ=10° to 90°, scan speed (°/s) was 0.044 to 0.089, and step size was 0.026°/step.

In addition, the (0,0,4) plane at 2θ=54.7±0.2° represents the thickness direction characteristics (c-axis direction characteristics) of the laminated structure with the two-dimensional planar structure of the graphite layer, and the (1,1,0) plane at 2θ=77.5±0.2° represents the planar characteristics (a-b-axis direction characteristics) of the laminated graphite layer. Therefore, the smaller the peak in the (0,0,4) plane, which represents the thickness-direction characteristics of the graphite layer plane, and the larger the peak in the (1,1,0) plane, which represents the planar characteristics of the graphite layer, the more the graphite plane is aligned at a high angle to the negative electrode current collector surface. In other words, the degree of alignment (O.I) may mean that the angle or slope of the graphite layer surface with respect to the negative electrode current collector surface is close to 90° when the value is close to 0, and the slope with respect to the negative electrode current collector surface is close to 0° or 180° when the value is larger.

In this aspect, the sliding portion of the negative electrode active layer according to the present disclosure may have a relatively low degree of alignment (O.I$_{sliding}$) of the carbon-based negative electrode active material contained in the sliding portion compared to the degree of alignment (O.I$_{flat}$) of the carbon-based negative electrode active material contained in the flat portion of the negative electrode active layer because the a-b axis crystal faces of the carbon-based negative electrode active material are aligned close to perpendicular to the negative electrode current collector. Specifically, the alignment (O.I$_{sliding}$) of the carbon-based negative electrode active material contained in the sliding portion may be from 0.1 to 0.8, and more specifically from 0.15 to 0.8; 0.15 to 0.6; 0.15 to 0.5; 0.2 to 0.5; 0.2 to 0.4; 0.25 to 0.45; 0.3 to 0.5; 0.3 to 0.8; 0.4 to 0.7; or 0.35 to 0.6.

By controlling the alignment degree (O.I$_{sliding}$) of the carbon-based negative electrode active material contained in the sliding portion to the above-described range, the present disclosure can improve the mobility of lithium ions at the negative electrode end during charging and discharging of the battery while reducing the electrode resistance, so that the N/P ratio can be prevented from decreasing even if the thickness of the negative electrode active layer end is thinner than the thickness of the positive electrode active layer end.

Furthermore, the carbon-based negative electrode active material contained in the flat portion may be oriented together with the carbon-based negative electrode active material contained in the sliding portion so that the a-b axis crystal face has a predetermined angle or tilt with respect to the negative electrode current collector surface, and accordingly, the alignment degree (O.I$_{flat}$) of the carbon-based negative electrode active material contained in the flat portion according to Equation 4 may satisfy a predetermined range. Specifically, the carbon-based negative electrode active material contained in the flat portion may have an alignment (O.I$_{flat}$) of 110% to 200% based on the alignment (O.I$_{sliding}$) of the carbon-based negative electrode active material contained in the sliding portion, more specifically, a ratio of 115% to 180%; 120% to 160%; or 125% to 150%. By adjusting the alignment degree (O.I$_{flat}$) of the carbon-based negative electrode active material contained in the flat portion to satisfy the above ranges, the present disclosure can be used to prevent the a-b axis crystal faces of the carbon-based negative electrode active material contained in the flat portion from being misaligned, and compared to the case in which the alignment degree (O.I$_{flat}$) based on the alignment degree (O.I$_{sliding}$) exceeding 200%, the average lithium ion mobility of the entire negative electrode active layer is improved, so that the electrical resistance of the negative electrode is reduced and the energy density can be further increased. In addition, if the carbon-based negative electrode active material contained in the flat portion has a ratio of alignment less than 100% based on the alignment degree (O.I$_{sliding}$), the electrical resistance of the negative electrode active layer in contact with the non-coating portion where the negative electrode tab is provided increases relatively, which promotes deterioration, which can be prevented.

Further, the sliding portion may control the intensity ratio ($I_{004}/I_{002}$) of the peak representing the (0,0,4) crystal face and the peak representing the (0,0,2) crystal face in the X-ray diffraction (XRD) spectroscopic analysis in a certain range. Specifically, the sliding portion can control the intensity ratio ($I_{004}/I_{002}$) to be greater than or equal to 0.04, and more specifically, it can be 0.04 to 0.09; 0.04 to 0.07. By controlling the intensity ratio ($I_{004}/I_{002}$) of the peak representing the (0,0,4) crystal face and the peak representing the (0,0,2) crystal face among the peaks detected in X-ray diffraction (XRD) spectroscopic analysis to the above range, the present disclosure has the advantage of suppressing an increase in direct current internal resistance, improving high rate characteristics, and improving cycle life characteristics.

Meanwhile, the negative electrode active layer according to the present disclosure may optionally further include, in addition to the negative electrode active material, a conductor, a binder, and other additives, etc. as needed.

The conductor may include one or more types among carbon black, acetylene black, ketjen black, carbon nanotubes, carbon fibers, and the like, but is not limited thereto.

As one example, the negative electrode active layer may contain carbon black, carbon nanotubes or carbon fibers as a conductor alone or in combination.

In such a case, the content of the conductor may be from 0.1 to 10 parts by weight, more specifically, 0.1 to 8 parts by weight, 0.1 to 5 parts by weight, 0.1 to 3 parts by weight, or 0.5 to 2 parts by weight, relative to the total 100 parts by weight of the negative electrode active layer. By controlling the content of the conductor to the above range, the present disclosure can prevent the resistance of the negative electrode from increasing due to a low content of the conductor, thereby reducing the charging capacity, and the content of the negative electrode active material from decreasing due to an excessive amount of the conductor, thereby reducing the charging capacity, or the rapid charging characteristics from decreasing due to an increase in the loading amount of the negative electrode active layer.

In addition, the binder can be appropriately applied as a component that assists in the bonding of the active material and the conductor and the bonding to the current collector to the extent that it does not degrade the electrical properties of the electrode, and may include one or more among vinylidene fluoride-hexafluoropropylene copolymer (PVDF-co-HFP), polyvinylidenefluoride (PVdF), and polyacrylonitrile, polymethylmethacrylate, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, polyacrylic acid, ethylene-propylene-diene monomer, sulfonated ethylene-propylene-diene monomer, styrene butadiene rubber, and fluorinated rubber.

The content of the binder may be from 0.1 to 10 parts by weight, more particularly from 0.1 to 8 parts by weight, from 0.1 to 5 parts by weight, from 0.1 to 3 parts by weight, or from 2 to 6 parts by weight, based on a total of 100 parts by weight of the negative electrode active layer. By controlling the content of the binder contained in the negative electrode active layer to the above range, the present disclosure can prevent the adhesive strength of the active layer from being reduced due to a low content of binder or the electrical properties of the electrode from being reduced due to an excess of binder.

Moreover, the negative electrode current collector is not particularly limited as long as it has a high conductivity without causing chemical changes in the battery, and for example, copper, stainless steel, nickel, titanium, calcined carbon, and the like can be used, and in the case of copper or stainless steel, a surface treatment with carbon, nickel, titanium, silver, and the like can also be used. In addition, the average thickness of the negative electrode current collector may be appropriately applied from 1 to 500 μm in consideration of the conductivity and total thickness of the negative electrode to be prepared.

The negative electrode for a lithium secondary battery according to the present disclosure has the above-described configuration, which has an excellent effect of suppressing lithium precipitation at the end of the negative electrode active layer during charging and discharging of the secondary battery, so that a lithium secondary battery comprising the negative electrode has the advantage of high safety and can be charged and discharged for a long time under high rate conditions.

Lithium Secondary Battery

Furthermore, in an exemplary embodiment, the present disclosure provides:

a lithium secondary battery including:
an electrode assembly including a positive electrode, a negative electrode according to the disclosure as described above, and a separator disposed between the positive electrode and negative electrode; and
an electrolyte composition.

The lithium secondary battery according to the present disclosure includes an electrode assembly, each having a plurality of positive electrodes and a plurality of negative electrodes alternately disposed and a separator disposed therebetween; and an electrolyte composition having lithium salts and electrolyte additives dissolved in a non-aqueous organic solvent. Here, the lithium secondary battery includes the negative electrode of the present disclosure wherein the carbon-based negative electrode active material contained in the sliding portion of the negative electrode active layer is aligned (or oriented) to be vertical and/or near vertical relative to the surface of the negative electrode current collector. Accordingly, the lithium secondary battery has the advantage of high safety, as precipitation of lithium from the surface of the negative electrode active layer, particularly from its end, is prevented during charging and discharging of the battery, particularly during charging and discharging under high rate conditions.

In this case, the negative electrode has the same configuration as the configuration described above, so the specific description is omitted.

The positive electrode further includes a positive electrode active layer prepared by applying, drying, and pressing a positive electrode slurry including a positive electrode active material onto the positive electrode current collector, wherein the positive electrode active layer may optionally further include a conductor, a binder, other additives, and the like, as needed.

The positive electrode active material is a material capable of electrochemically reacting on the positive electrode current collector and may include one or more of the lithium metal oxides represented by Chemical Formula 1 and Chemical Formula 2 below that are capable of reversibly intercalating and deintercalating lithium ions:

$$Li_x[Ni_yCo_zMn_wM^1_v]O_2 \qquad \text{[Chemical Formula 1]}$$

$$LiM^2_pMn_qP_rO_4 \qquad \text{[Chemical Formula 2]}$$

in Chemical Formula 1 and Chemical Formula 2, $M^1$ is one or more of the following elements of W, Cu, Fe, V, Cr, Ti, Zr, Zn, Al, In, Ta, Y, La, Sr, Ga, Sc, Gd, Sm, Ca, Ce, Nb, Mg, B, and Mo, x, y, z, w, and v are 1.0≤x≤1.30, 0.5≤y<1, 0<z≤0.3, 0<w≤0.3, and 0≤v≤0.1, respectively, and y+z+w+v=1, $M^2$ is Ni, Co, or Fe, p is 0.05≤p≤1.0, q is either 1-p or 2-p, and r is 0 or 1.

Lithium metal oxides represented by Chemical Formula 1 and Chemical Formula 2, respectively, are materials containing a high content of nickel (Ni) and manganese (Mn), and have the advantage of being able to stably supply high capacity and/or high voltage electricity when used as a positive electrode active material.

Here, the lithium metal oxide represented by Chemical Formula 1 may include $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, $LiNi_{0.7}Co_{0.1}Mn_{0.1}Al_{0.1}O_2$, and the like, and the lithium metal oxide represented by Chemical Formula 2 may include $LiNi_{0.7}Mn_{1.3}O_4$, $LiNi_{0.5}Mn_{1.5}O_4$, $LiNi_{0.3}Mn_{1.7}O_4$, $LiFePO_4$, $LiFe_{0.8}Mn_{0.2}PO_4$, $LiFe_{0.5}Mn_{0.5}PO_4$, and the like, which may be used alone or in combination.

Furthermore, the positive electrode active material may be included in the amount of at least 85 parts by weight based on the weight of the positive electrode active layer, and more specifically may be included in the amount of at least 90 parts by weight, at least 93 parts by weight, or at least 95 parts by weight.

Furthermore, the positive electrode active layer may further include a conductor, a binder, other additives, and the like along with the positive electrode active material.

In this case, the conductor is used to improve the electrical performance of the positive electrode, and may be any material conventionally used in the art, but more particularly may include one or more of natural graphite, synthetic graphite, carbon black, acetylene black, denka black, ketjen black, super-P, channel black, furnace black, lamp black, summer black, graphene, and carbon nanotubes.

Furthermore, the conductor may be included in the amount of 0.1 to 5 parts by weight based on the weight of each positive electrode active layer, more particularly may be included in the amount of 0.1 to 4 parts by weight; 2 to 4 parts by weight; 1.5 to 5 parts by weight; 1 to 3 parts by weight; 0.1 to 2 parts by weight; or 0.1 to 1 part by weight.

Furthermore, the binder serves to cause the positive electrode active material, positive electrode additive, and conductor to be bonded together, and may be used without being particularly limited as long as it has this function. Specifically, the binder may include one or more resins selected from polyvinylidene fluoride-hexafluoropropylene copolymer (PVdF-co-HFP), polyvinylidenefluoride (PVdF), polyacrylonitrile, polymethylmethacrylate, and copolymers thereof. In one example, the binder may include polyvinylidenefluoride.

Additionally, the binder may be included in the amount of 1 to 10 parts by weight based on the weight of each positive electrode active layer, more particularly may be included in the amount of 2 to 8 parts by weight; or 1 to 5 parts by weight.

The total thickness of the positive electrode active layer is not particularly limited, but may be from 50 μm to 300 μm, and more particularly from 100 μm to 200 μm; 80 μm to 150 μm; 120 μm to 170 μm; 150 μm to 300 μm; 200 μm to 300 μm; or 150 μm to 190 μm.

Furthermore, as the positive electrode current collector, the positive electrode may use those with a high conductivity without causing chemical changes in the battery. For example, stainless steel, aluminum, nickel, titanium, calcined carbon, and the like can be used, and in the case of aluminum or stainless steel, those that are surface treated with carbon, nickel, titanium, silver, and the like can be used. Furthermore, the average thickness of the current collector may be suitably applied from 3 to 500 μm, considering the conductivity and total thickness of the positive electrode being manufactured.

Meanwhile, the separator interposed between the positive electrode and the negative electrode of each unit cell is an insulating thin film having high ionic permeability and mechanical strength, which is conventionally used in the art, but is not particularly limited, and in particular, those including one or more of the following polymers may be used: chemically resistant and hydrophobic polypropylene; polyethylene; polyethylene-propylene copolymer. The separator may take the form of a porous polymeric substrate, such as a sheet or nonwoven fabric including the above-described polymers, and in some cases may take the form of a composite separator in which organic or inorganic particles are coated by an organic binder on the porous polymeric substrate. Furthermore, the separator may have an average pore diameter from 0.01 to 10 μm, and an average thickness from 5 to 300 μm.

Meanwhile, the lithium secondary battery according to the present disclosure may also be in the form of a secondary battery, which may include a stack-type; zigzag; or zigzag-stacked electrode assembly, although this is not particularly limited. As one example, a lithium secondary battery according to the present disclosure may be a pouch-type secondary battery or a prismatic secondary battery.

The negative electrode applied to the lithium secondary battery according to the present disclosure implements a low degree of alignment ($O.I_{sliding}$) of the carbon-based active material contained in the sliding portion of the negative electrode active layer, so that even if the N/P ratio of the positive electrode and negative electrode stacked in the electrode assembly becomes less than 1, the effect of suppressing lithium precipitation from the surface of the negative electrode active layer, specifically the end, during charging and discharging of the secondary battery is excellent. Thus, the present lithium secondary battery has the advantage of high safety and can be charged and discharged for a long time under high rate conditions.

Hereinafter, the present disclosure will be described in more detail by way of examples and experimental examples.

However, the following examples and experimental examples are only illustrative of the present disclosure, and the contents of the present disclosure are not limited to the following examples and experimental examples.

Examples 1 to 7. Preparation of Negative Electrode for Lithium Secondary Battery Natural graphite was prepared as a negative electrode active material, carbon black as a conductor, and carboxymethylcellulose (CMC) and styrene butadiene rubber (SBR) as binders. 95 parts by weight of natural graphite, 1 part by weight of carbon black, 1.5 parts by weight of carboxymethyl cellulose (CMC), and 2.5 parts by weight of styrene butadiene rubber (SBR) were mixed with water to have a solid content of 50 to 55% to form a negative electrode slurry which was cast on a copper thin plate (thickness: 10 μm) to be 100 to 120 mg/cm².

A magnetic field was then applied to the front of the slurry using magnets placed at the upper and lower portions of the applied negative electrode slurry to induce the orientation of the natural graphite. The magnetic field was applied at a strength of 1.0 to 1.2 T for the times shown in Table 1 below. In addition, the magnets used to apply the magnetic field were permanent magnets with a length ratio of 110-120% relative to the width direction of the negative electrode slurry.

The negative electrode was then prepared by drying the copper sheet with the negative electrode slurry applied, which induced the orientation of the carbon-based negative electrode active material contained in the sliding portion, in a vacuum oven at 130° C. and rolling it to a density of 1.63±0.2 g/cc.

i) The sphericity of the carbon-based negative electrode active material used for the manufactured negative electrode and ii) the alignment of the carbon-based negative electrode active material by the position of the negative electrode active layer ($S_{60/0}$ and $O.I_{sliding}$) were calculated. Specifically, i) the sphericity of the carbon-based negative electrode active material was obtained by calculating the ratio of the shortest diameter (short diameter) to the longest diameter (long diameter) of any diameter passing through the center of the negative electrode active material particle using images obtained by scanning electron microscopy (SEM).

In addition, ii) the alignment of carbon-based negative electrode active materials ($S_{60/0}$ and $O.I_{sliding}$) by position in the negative electrode active layer was obtained by performing near-field X-ray absorption fine structure (NEXAFS) spectroscopy and X-ray diffraction (XRD) spectroscopy on three random points in the flat and sliding portions of the negative electrode active layer, respectively, and measuring the spectra. Here, the measurement conditions for the near-end X-ray fluorescence spectroscopy (NEXAFS) and X-ray diffraction (XRD) were as follows:

$$S_{60/0} = \frac{I60_{B/A}}{I0_{B/A}} \quad \text{[Equation 1]}$$

$$I60_{B/A} = \frac{I60_B}{I60_A} \quad \text{[Equation 2]}$$

$$I0_{B/A} = \frac{I0_B}{I0_A} \quad \text{[Equation 3]}$$

in Equation 1 to Equation 3, $S_{60/0}$ represents a value of a ratio of the ratio of a peak intensity ($I60_{B/A}$) at an incident angle of 60° of the X-ray to a ratio of a peak intensity ($I0_{B/A}$) at an incident angle of 0° of the X-ray, $I60_A$ represents an intensity of a strongest peak present at 286±1.0 eV, at the incidence angle of 60°, $I60_B$ represents an intensity of a strongest peak present at 292.5±1.0 eV at the incidence angle of 60°, $I0_A$ represents an intensity of a strongest peak at 286±1.0 eV at the incidence angle of 0°, $I0_B$ represents an intensity of a strongest peak present at 292.5±1.0 eV at the incidence angle of 0°.

$$O.I = I_{004}/I_{110} \quad \text{[Equation 4]}$$

in Equation 4, $I_{004}$ represents the area of the peak representing the (0,0,4) crystal face in the X-ray diffraction spectroscopy (XRD) measurement of the negative active layer, $I_{110}$ represents the area of the peak representing the (1,1,0) crystal face in an X-ray diffraction (XRD) measurement of the negative active layer.

TABLE 1

| | Magnetic field application time | Sphericity of natural graphite | Sliding portion Average alignment | | | Flat portion Average alignment | |
|---|---|---|---|---|---|---|---|
| | | | $S_{60/0}$ | O.I. | $I_{004}/I_{002}$ | $S_{60/0}$ | O.I. |
| Example 1 | 10 sec | 0.91 | 0.68 | 0.29 | 0.05 | 1.02 | 0.44 |
| Example 2 | 13 sec | 0.91 | 0.65 | 0.26 | 0.06 | 0.98 | 0.39 |
| Example 3 | 15 sec | 0.91 | 0.63 | 0.24 | 0.05 | 0.95 | 0.36 |
| Example 4 | 8 sec | 0.91 | 0.73 | 0.31 | 0.04 | 1.10 | 0.47 |
| Example 5 | 5 sec | 0.91 | 0.75 | 0.35 | 0.03 | 1.16 | 0.55 |
| Example 6 | 20 sec | 0.91 | 0.63 | 0.23 | 0.06 | 0.95 | 0.36 |
| Example 7 | 15 sec | 0.65 | 0.91 | 0.87 | 0.04 | 1.35 | 1.31 |

① Near-end X-ray fluorescence spectroscopy (NEXAFS) analysis:

Acceleration voltage slit=1 degree, receiving slit=0.1 mm, scattering slit=1 degree: 1.0 GeV to 1.5 GeV Accumulation current: 80 to 350 mA Incidence angle: 60° or 0°

② X-ray diffraction (XRD) analysis:

Target: Cu(Kα-ray) graphite monochromator

Slit: Divergence

Then, the alignments ($S_{60/0}$ and $O.I_{sliding}$) of natural graphite (i.e., carbon-based negative electrode active materials) were calculated from each of the spectra obtained using Equations 1 through 4 below and their average values were calculated. The results obtained are shown in Table 1 below:

Comparative Examples 1 to 3. Preparation of Negative Electrode for Lithium Secondary Battery The negative electrode for the lithium secondary battery was prepared by performing the same method as in Example 1, except that a magnetic field was either a) not applied at all to the surface of the negative electrode slurry applied on the copper thin plate or b) applied only to the edge of the negative electrode slurry corresponding to the sliding portion of the negative electrode active layer.

In the case of applying the magnetic field to the edge of the negative electrode slurry only, the length ratio of the magnet applying the magnetic field was adjusted to a length ratio of 100% or 110~120% based on the edge of the negative electrode slurry, that is, the width direction of the sliding portion.

In addition, i) the sphericity of the carbon-based negative electrode active material used in each of the manufactured negative electrodes and ii) the alignment of the natural graphite (i.e., carbon-based negative electrode active material) obtained by measuring near-end X-ray absorption fine structure (NEXAFS) spectroscopy and X-ray diffraction (XRD) spectroscopy, respectively, for each position of the negative electrode active layer ($S_{60/0}$ and $O.I._{sliding}$) and iii) the ratio ($I_{004}/I_{002}$) of the intensity of the peak representing the (0,0,4) plane to the intensity of the peak representing the (0,0,2) plane calculated from X-ray diffraction (XRD) are shown in Table 2 below.

TABLE 2

| | Whether magnetic field was applied | Magnetic field application time | Length ratio of magnet | Sphericity of natural graphite | Sliding portion Average alignment | | | Flat portion Average alignment | |
|---|---|---|---|---|---|---|---|---|---|
| | | | | | $S_{60/0}$ | O.I. | $I_{004}/I_{002}$ | $S_{60/0}$ | O.I. |
| Comparative Example 1 | X | 0 sec | — | 0.91 | 4.52 | 12.3 | 0.11 | 4.48 | 12.1 |
| Comparative Example 2 | ○ | 15 sec | 100% | 0.91 | 1.19 | 1.97 | 0.05 | 2.41 | 8.94 |
| Comparative Example 3 | ○ | 15 sec | 110~120% | 0.91 | 1.10 | 1.52 | 0.05 | 2.38 | 8.91 |

Examples 8 to 14 and Comparative Examples 4 to 6. Preparation of lithium secondary batteries $LiNi_{0.7}Co_{0.1}Mn_{0.1}Al_{0.1}O_2$ with a particle size of 5 μm was prepared as the positive electrode active material, mixed with a carbon-based conductor and polyvinylidene fluoride as a binder in a weight ratio of 94:3:3 in N-methyl pyrrolidone (NMP) to form a slurry, cast on an aluminum thin plate, dried in a vacuum oven at 120° C., and rolled to prepare the positive electrode.

The lithium secondary battery was assembled by interposing an 18 μm polypropylene separator between the positive electrode obtained above and the negative electrode prepared in the Example and Comparative Examples, respectively, inserting it into a case, and then injecting an electrolyte composition.

The type of negative electrode applied to each lithium secondary battery is shown in Table 3 below.

TABLE 3

| | Type of negative electrode applied |
|---|---|
| Example 8 | Negative electrode prepared in Example 1 |
| Example 9 | Negative electrode prepared in Example 2 |
| Example 10 | Negative electrode prepared in Example 3 |
| Example 11 | Negative electrode prepared in Example 4 |
| Example 12 | Negative electrode prepared in Example 5 |
| Example 13 | Negative electrode prepared in Example 6 |
| Example 14 | Negative electrode prepared in Example 7 |
| Comparative Example 4 | Negative electrode prepared in Comparative Example 1 |
| Comparative Example 5 | Negative electrode prepared in Comparative Example 2 |
| Comparative Example 6 | Negative electrode prepared in Comparative Example 3 |

Experimental Example 1

To evaluate the safety of the lithium secondary battery according to the present disclosure during high-rate charge and discharge, the following experiments were performed on each of the lithium secondary batteries manufactured in the Example and Comparative Examples.

a) Evaluating the High Rate Characteristics of a Secondary Battery

First, an initial charge was performed on each of the manufactured lithium secondary batteries. Specifically, the lithium secondary battery was initially charged at a temperature of 25° C. with a charging current of 0.3 C to a charging end voltage of 4.2~4.25 V, and activated until the current density was 0.02 C at the end voltage.

Each activated lithium secondary battery was fully charged at a 0.1 C-rate at room temperature 22° C. The fully charged lithium secondary batteries were then discharged at a 0.1 C rate to measure the initial discharge capacity. Then, each lithium secondary battery was fully charged again at 0.1 C-rate and discharged at 1.0 C, 2.0 C, 5.0 C, and 9.0 C rates, respectively, to measure the relative discharge capacity ratio based on the initial discharge capacity by discharge rate, and the measured discharge capacity ratios are shown in Table 4.

b) Evaluating the Safety of the Secondary Battery

First, an initial charge was performed on each of the manufactured lithium secondary batteries. Specifically, the lithium secondary battery was initially charged at a temperature of 25° C. with a charging current of 0.3 C to a charging end voltage of 4.2~4.25 V, and activated until the current density was 0.02 C at the end voltage.

Then, for each activated lithium secondary battery, the battery was charged to a charge end voltage of 4.2-4.25 V at a temperature of 25° C. with a charge current of 2.0 C, and discharged in constant current mode until the current density at the end voltage was 0.02 C. One cycle of such charge and discharge was performed for a total of 100 cycles, and each lithium secondary battery subjected to 100 cycles of charge and discharge was disassembled to check for lithium precipitation on the negative electrode surface. The results are shown in Table 4.

TABLE 4

| | Relative discharge capacity ratio [%] | | | | Whether lithium metal precipitated |
|---|---|---|---|---|---|
| | 1 C | 2 C | 5 C | 9 C | |
| Example 8 | 99.2 | 98.4 | 91.2 | 81.7 | x |
| Example 9 | 99.5 | 98.7 | 91.6 | 82.6 | x |

TABLE 4-continued

|  | Relative discharge capacity ratio [%] | | | | Whether lithium metal precipitated |
|---|---|---|---|---|---|
|  | 1 C | 2 C | 5 C | 9 C |  |
| Example 10 | 99.7 | 99.0 | 92.5 | 84.8 | x |
| Example 11 | 99.1 | 98.0 | 90.7 | 80.2 | x |
| Example 12 | 99.0 | 97.2 | 88.3 | 79.9 | x |
| Example 13 | 99.7 | 98.9 | 91.8 | 83.2 | x |
| Example 14 | 99.0 | 96.8 | 89.5 | 79.4 | x |
| Comparative Example 4 | 97.5 | 92.1 | 81.1 | 68.4 | o |
| Comparative Example 5 | 97.9 | 93.6 | 82.4 | 70.8 | o |
| Comparative Example 6 | 98.1 | 94.3 | 82.4 | 71.8 | x |

As shown in Table 4 above, the negative electrode for a lithium secondary battery according to the present disclosure shows that lithium precipitation from the negative electrode surface is suppressed and the capacity retention rate is high during high-rate charge and discharge because the carbon-based negative electrode active material contained in the sliding portion of the negative electrode active layer is aligned close to perpendicular to the surface of the negative electrode current collector.

From these results, it can be seen that the negative electrode for a lithium secondary battery according to the present disclosure has a good effect of suppressing lithium precipitation at the end of the negative electrode active layer during charging and discharging of the secondary battery, so that a lithium secondary battery comprising it has high safety and can be charged and discharged for a long time under high rate conditions.

Although the above has been described with reference to a preferred exemplary embodiment of the present disclosure, it will be understood by those skilled in the art or having ordinary knowledge of the art that various modifications and changes can be made to the present disclosure without departing from the ideas and technical scope of the present disclosure described in the following claims.

Accordingly, the technical scope of the present disclosure is not limited to what is described in the detailed description of the specification, but should be defined by the patent claims.

The invention claimed is:

1. A negative electrode for a lithium secondary battery, comprising:
a negative electrode current collector, and
a negative electrode active layer arranged on at least one side of the negative electrode current collector and including a carbon-based negative electrode active material;
wherein the negative electrode active layer is divided into a flat portion having a constant thickness relative to a cross-sectional structure of the negative electrode active layer, and a sliding portion disposed at an end of the flat portion and having a thickness gradient;
wherein the flat portion and the sliding portion have ratios of 98.5% to 99.9% and 0.1 to 1.5% of a total length in a width direction, respectively, based on the cross-sectional structure of the negative electrode active layer;
wherein the sliding portion has a value of 1.0 or less according to Equation 1 when analyzed by near-end X-ray absorption fine structure (NEXAFS) spectroscopy, and an alignment (O.I) of the carbon-based negative electrode active material of 0.1 to 0.6 according to Equation 4 when analyzed by X-ray diffraction (XRD) spectroscopy, and wherein the alignment (O.I) of the carbon-based negative electrode active material contained in the flat portion has a ratio of 110% to 200% based on the alignment of the carbon-based negative electrode active material contained in the sliding portion:

$$S_{60/0} = \frac{I60_{B/A}}{I0_{B/A}} \quad \text{[Equation 1]}$$

$$I60_{B/A} = \frac{I60_B}{I60_A} \quad \text{[Equation 2]}$$

$$I0_{B/A} = \frac{I0_B}{I0_A} \quad \text{[Equation 3]}$$

$$O.I = I_{004}/I_{110} \quad \text{[Equation 4]}$$

wherein, in Equation 1 to Equation 4,
$S_{60/0}$ represents a value of a ratio of a ratio of a peak intensity ($I60_{B/A}$) at an incidence angle of 60° of the X-ray to a ratio of a peak intensity ($I0_{B/A}$) at an incidence angle of 0° of the X-ray,
$I60_A$ represents an intensity of a strongest peak present at 286±1.0 eV, at the incidence angle of 60°,
$I60_B$ represents an intensity of a strongest-peak present at 292.5±1.0 eV at the incidence angle of 60°,
$I0_A$ represents an intensity of a strongest peak at 286±1.0 eV at the incidence angle of 0°,
$I0_B$ represents an intensity of a strongest peak present at 292.5±1.0 eV at the incidence angle of 0°,
$I_{004}$ represents an area of a peak representing a (0,0,4) crystal face, and
$I_{110}$ represents an area of a peak representing a (1,1,0) crystal face.

2. The negative electrode of claim 1, wherein the sliding portion has a ratio ($I_{004}/I_{002}$) of an intensity of a peak representing a (0,0,4) crystal face to an intensity of a peak representing a (0,0,2) crystal face in X-ray diffraction (XRD) spectroscopy that is greater than or equal to 0.04.

3. The negative electrode of claim 1, wherein a cross-section of the negative electrode current collector is divided into a coating portion having the negative electrode active layer disposed thereon and a plurality of non-coating portions having no negative electrode active layer disposed thereon, and
the sliding portion abuts a non-coating portion of the plurality of non-coating portions, the non-coating portion of the plurality of non-coating portions provided with a negative electrode tab.

4. The negative electrode of claim 1, wherein the sliding portion has a width ranging from 1 mm to 30 mm based on the cross-sectional structure of the negative electrode active layer.

5. The negative electrode of claim 1, wherein the carbon-based negative electrode active material includes one or more of natural graphite or synthetic graphite.

6. The negative electrode of claim 1, wherein the carbon-based negative electrode active material has a sphericity of 0.75 or greater.

7. A lithium secondary battery, comprising:
an electrode assembly including a positive electrode, the negative electrode of claim 1, and a separator disposed between the positive electrode and the negative electrode.

8. The lithium secondary battery of claim 7, wherein the positive electrode comprises a positive electrode active layer arranged on at least one side of a positive electrode current collector and including at least one type of a positive electrode active material represented by Chemical Formula 1 or Chemical Formula 2:

$$Li_x[Ni_yCo_zMn_wM^1_v]O_2 \quad \text{[Chemical Formula 1]}$$

$$LiM^2_pMn_{1-p}O_4 \quad \text{[Chemical Formula 2]}$$

wherein, in Chemical Formula 1 and Chemical Formula 2, $M^1$ is one or more of the following elements of W, Cu, Fe, V, Cr, Ti, Zr, Zn, Al, In, Ta, Y, La, Sr, Ga, Sc, Gd, Sm, Ca, Ce, Nb, Mg, B, or Mo, x, y, z, w, and v are $1.0 \leq x \leq 1.30$, $0.5 \leq y < 1$, $0 < z \leq 0.3$, $0 < w \leq 0.3$, and $0 \leq v \leq 0.1$, respectively, and $y+z+w+v=1$, $M^2$ is Ni, Co, or Fe, and p is $0.05 \leq p \leq 1.0$.

9. The lithium secondary battery of claim 8, wherein the positive electrode active material includes one or more of $LiNi_{0.8}Co_{0.1}Mn_{0.1}O_2$, $LiNi_{0.6}Co_{0.2}Mn_{0.2}O_2$, $LiNi_{0.9}Co_{0.05}Mn_{0.05}O_2$, $LiNi_{0.6}Co_{0.2}Mn_{0.1}Al_{0.1}O_2$, $LiNi_{0.6}Co_{0.2}Mn_{0.15}Al_{0.05}O_2$, $LiNi_{0.7}Co_{0.1}Mn_{0.1}Al_{0.1}O_2$, $LiNi_{0.7}Mn_{1.3}O_4$, $LiNi_{0.5}Mn_{1.5}O_4$, $LiNi_{0.3}Mn_{1.7}O_4$, $LiFePO_4$, $LiFe_{0.8}Mn_{0.2}PO_4$, or $LiFe_{0.5}Mn_{0.5}PO_4$.

10. The lithium secondary battery of claim 7, wherein the electrode assembly is a stack-type electrode assembly; a zigzag electrode assembly; or a zigzag-stacked electrode assembly.

* * * * *